(12) United States Patent
Shin (10) Patent No.: US 11,712,959 B2
(45) Date of Patent: Aug. 1, 2023

(54) SYSTEM AND METHOD FOR CONTROLLING LOCK-UP OF ENGINE CLUTCH OF HYBRID VEHICLE

(71) Applicants: Hyundai Motor Company, Seoul (KR); Kia Motors Corporation, Seoul (KR)

(72) Inventor: Hong Chul Shin, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 415 days.

(21) Appl. No.: 17/036,676

(22) Filed: Sep. 29, 2020

(65) Prior Publication Data

US 2021/0362581 A1 Nov. 25, 2021

(30) Foreign Application Priority Data

May 19, 2020 (KR) .......................... 10-2020-0059434

(51) Int. Cl.
*B60K 6/46* (2007.10)
*B60W 10/02* (2006.01)
*B60W 10/08* (2006.01)
*B60W 10/06* (2006.01)

(52) U.S. Cl.
CPC ............ *B60K 6/46* (2013.01); *B60W 10/0235* (2020.02); *B60W 10/06* (2013.01); *B60W 10/08* (2013.01)

(58) Field of Classification Search
CPC ......... B60K 6/46; B60W 10/02; B60W 10/06; B60W 10/08; B60W 10/026; B60W 10/0235; B60W 2510/0638; F02N 2300/104; F02N 2200/022; F02N 2200/042; F02N 11/04; Y02T 10/62
See application file for complete search history.

(56) References Cited

U.S. PATENT DOCUMENTS

| 9,616,884 B1 * | 4/2017 | Cho ..................... B60W 10/08 |
| 10,065,626 B2 * | 9/2018 | Wang ................... B60W 10/08 |
| 2009/0312895 A1 * | 12/2009 | Kim .......................... B60K 6/48 |
| | | 903/902 |
| 2011/0295455 A1 * | 12/2011 | Schenk ................... B60K 6/48 |
| | | 903/902 |

(Continued)

*Primary Examiner* — Phutthiwat Wongwian
*Assistant Examiner* — Arnold Castro
(74) *Attorney, Agent, or Firm* — Morgan, Lewis & Bockius LLP (57) ABSTRACT

A system for controlling a lock-up of engine clutch may include an engine and a motor; the engine clutch mounted between the engine and the motor and configured to selectively transmit power of the engine between the engine and the motor; a hybrid starter generator (HSG) connected to a crank pulley of the engine and driven to start the engine; and a controller connected to the HSG and configured to determine a virtual engine speed in an engine firing process and a torque reduction ratio of the HSG according to the virtual engine speed after an engine cranking process and determine a correction reduction ratio with respect to the torque reduction ratio of the HSG using a difference value between the virtual engine speed and an actual engine speed, and adjust an increase or a decrease of the torque reduction ratio of the HSG to synchronize an engine speed with a motor speed for the lock-up of the engine clutch.

19 Claims, 9 Drawing Sheets

(56) References Cited

U.S. PATENT DOCUMENTS

| | | | |
|---|---|---|---|
| 2012/0083952 A1* | 4/2012 | Smith | B60K 6/442 |
| | | | 180/65.265 |
| 2013/0296109 A1* | 11/2013 | Nedorezov | B60W 10/08 |
| | | | 477/5 |
| 2014/0249710 A1* | 9/2014 | Nakanishi | F02N 99/006 |
| | | | 180/65.265 |
| 2015/0246670 A1* | 9/2015 | Ideshio | B60W 10/02 |
| | | | 180/65.265 |
| 2016/0121880 A1* | 5/2016 | Sung | B60K 6/387 |
| | | | 180/65.265 |
| 2018/0162378 A1* | 6/2018 | Kim | B60W 10/02 |
| 2019/0032586 A1* | 1/2019 | Fracchia | B60K 6/387 |
| 2021/0016774 A1* | 1/2021 | Cho | B60W 30/18027 |
| 2022/0185291 A1* | 6/2022 | Kim | B60W 20/15 |

* cited by examiner

SYSTEM AND METHOD FOR CONTROLLING LOCK-UP OF ENGINE CLUTCH OF HYBRID VEHICLE

CROSS-REFERENCE TO RELATED APPLICATION

The present application claims priority to Korean Patent Application No. 10-2020-0059434 filed on May 19, 2020, the entire contents of which is incorporated herein for all purposes by this reference.

BACKGROUND OF THE INVENTION

Field of the Invention

The present invention relates to a system and a method for controlling a lock-up of an engine clutch of a hybrid vehicle. More particularly, it relates to a system and a method for controlling a lock-up of an engine clutch of a hybrid vehicle, which are capable of improving synchronizing lock-up performance of an engine clutch by adaptively controlling a torque of a hybrid starter generator (HSG).

Description of Related Art

Hybrid vehicles among eco-friendly vehicles are vehicles configured for reducing exhaust gases and improving fuel efficiencies by employing engines as well as motors as power sources. The hybrid vehicles are provided with powertrains which transmit power of the engines or the motors to driving wheels or transmit power of the engines and the motor to the driving wheels.

Figure 1:
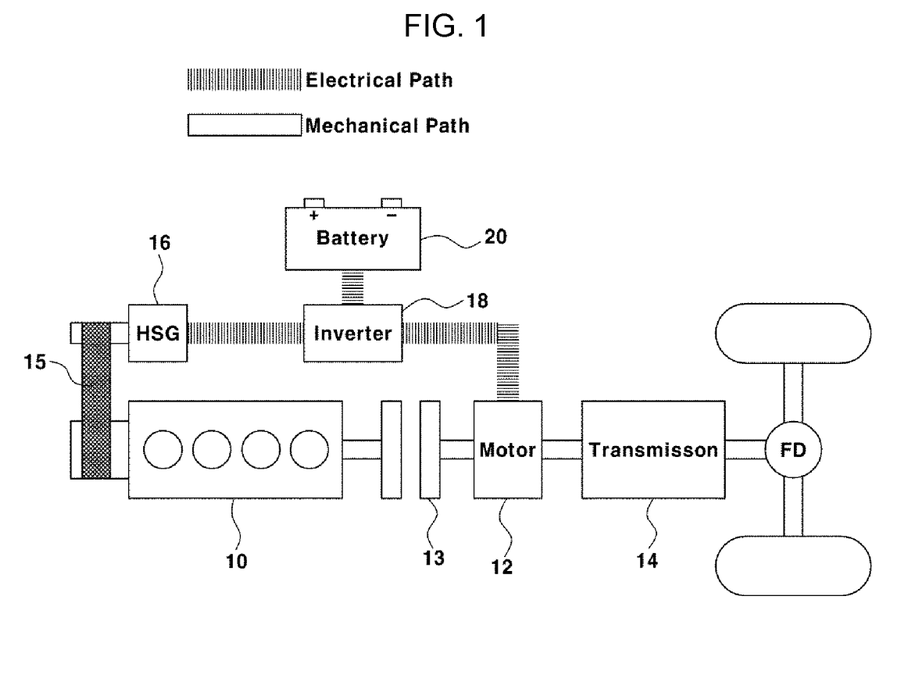
FIG. 1 is a power transmission block diagram illustrating a powertrain of a hybrid vehicle.

As shown in FIG. 1, a powertrain for the hybrid vehicle may include an engine 10 and a motor 12 which are mounted in series with each other, an engine clutch 13 mounted between the engine 10 and the motor 12 and configured to transmit or disconnect power of the engine 10, a transmission 14 configured to shift power of the motor 12 or power of the motor 12 and the engine 10 to output the shifted power to a driving wheel, a hybrid starter generator (HSG) 16, which is a kind of a motor, connected to a crank pulley of the engine 10 and configured to generate electric power for a starting of the engine 10 and battery charging, an inverter 18 configured to control charging/discharging of the motor 12 and control the electric power generation of the HSG 16, and a high voltage battery 20 chargeably and dischargeably connected to the motor 12 and the HSG 16 via the inverter 18.

A driving mode of the hybrid vehicle includes an electric vehicle (EV) mode which is an electric vehicle mode in which only the power of the motor 12 is used for driving of the hybrid vehicle, and a hybrid EV (HEV) mode in which the motor 12 is used as an auxiliary power source while the engine 10 is used as a main power source.

To this end, in the EV mode, the hybrid vehicle is driving due to only an output torque of the motor 12 in a lock-up release state of the engine clutch 13, whereas, in the HEV mode, the hybrid vehicle is driving due to the sum of output torques of the engine 10 and the motor 12 in a lock-up state of the engine clutch 13.

Meanwhile, in order for a lock-up of the engine clutch 13, a synchronizing lock-up control method is mainly used.

The synchronizing lock-up control method refers to a method in which a hybrid vehicle starts up in an EV mode according to driving of a motor, the revolutions per minute (RPM) of an engine is synchronized with that of the motor to switch to an HEV mode, in which a driving force of the engine is used together with a driving force of the motor configured for acceleration, and then an engine clutch is locked-up.

For reference, control relating to an engine clutch lock-up operation and a lock-up release operation may be performed by a hybrid controller which is a highest-level controller of the hybrid vehicle.

Here, the conventional engine clutch lock-up control method will be referred to as follows.

Figure 2:
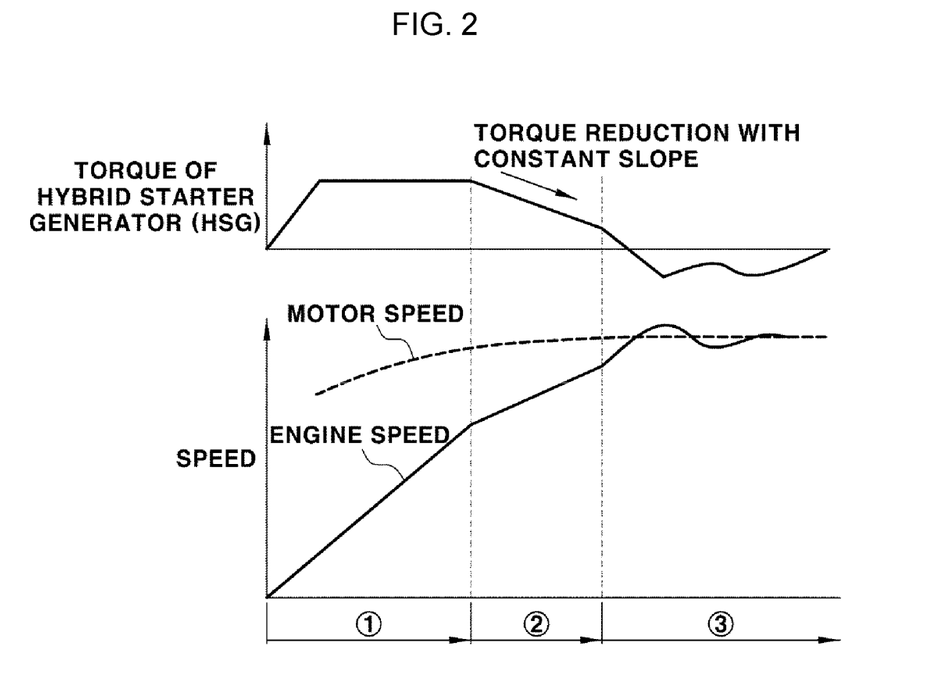
FIG. 2 is a control graph showing a conventional engine clutch lock-up control process.

As shown in FIG. 2, a process of controlling a synchronizing lock-up of the engine clutch 13 is performed in detail in the order of an engine cranking process, an engine firing process, and an engine speed control process.

First, the engine cranking process is performed due to driving of the HSG 16 connected to a crankshaft of the engine 10, and a torque of the HSG 16 is output as a maximum torque in the engine cranking process indicated by Section ① in FIG. 2.

The engine firing process refers to a process in which engine ignition is performed due to cranking of the engine 10. The engine cranking process is shifted to the engine firing process indicated by Section ② in FIG. 2, and when an engine speed reaches a predetermined RPM, or more, a torque of the HSG 16 is reduced with a constant slope to be output.

As indicated by Section ③ in FIG. 2, the engine speed control process is a process of synchronizing the engine speed with a motor speed. In the engine firing process, when the torque of the HSG 16, which is reduced with the constant slope, becomes to be less than a predetermined torque, the engine speed control process is performed to synchronize the engine speed with the motor speed, and when the engine speed is synchronized with the motor speed, an engine clutch lock-up control is performed.

However, the above-described conventional method of controlling a synchronizing lock-up of an engine clutch has the following problems.

Figure 3:
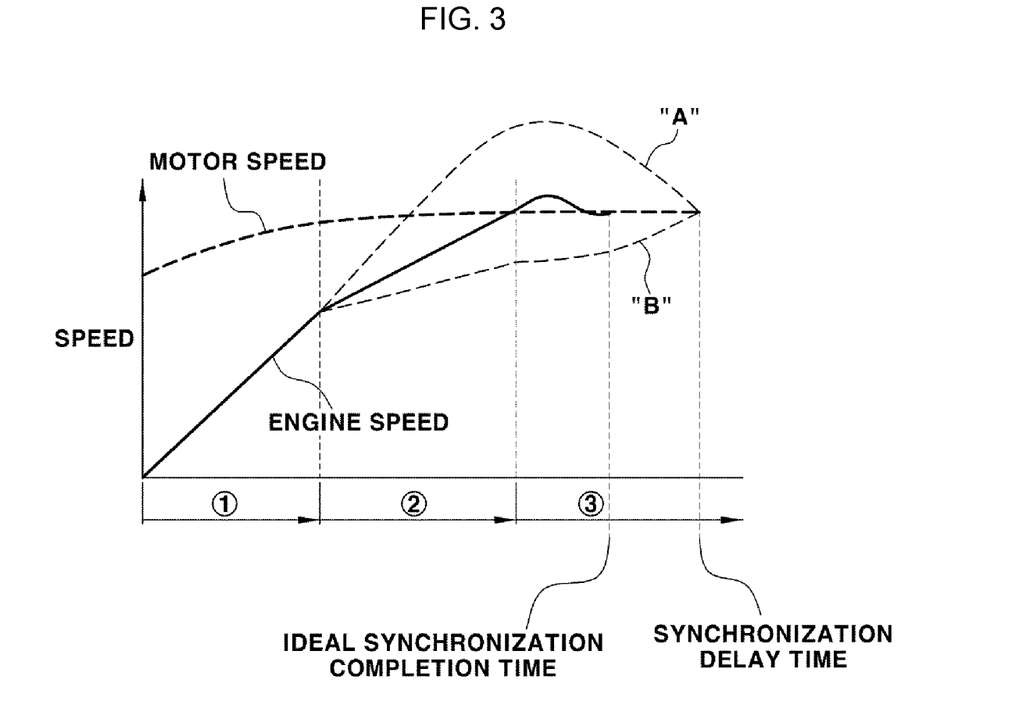
FIG. 3 is a control graph showing a problem during the conventional engine clutch lock-up control process.

First, since an engine speed profile may be varied due to conditions such as a first combustion timing which is a timing in which initial ignition is performed when the engine is cranked and then ignited, temperatures of engine cooling water and engine oil, a temperature of intake air, and the like, as indicated by "A" in FIG. 3, an engine speed overrun phenomenon may occur in which the engine speed is rapidly increased when compared with its original level, and thus there is a problem in that synchronization between the engine speed and the motor speed for locking-up the engine clutch is not smoothly performed.

Second, since the engine speed profile may be varied due to the conditions such as the first combustion timing which is the timing in which the initial ignition is performed when the engine is cranked and then ignited, the temperatures of the engine cooling water and the engine oil, the temperature of the intake air, and the like, as indicated by "B" in FIG. 3, a phenomenon in which the engine speed is rapidly decreased when compared with its original level from before the synchronization may occur, and similarly, there is a problem in that synchronization between the engine speed and the motor speed for the lock-up of the engine clutch is not smoothly performed.

Thus, as described above, owing to the overrun phenomenon in which the engine speed is increased when compared with its original level during the engine firing process after the cranking of the engine or a phenomenon in which the engine speed is decreased when compared with its original level, at a time when ideal synchronization between the engine speed and the motor speed is completed, ideal engine speed control in which a torque of the HSG reaches 0 (zero) Nm is not smoothly performed. Consequently, there is a problem in that the ideal synchronization between the engine speed and the motor speed is not smoothly performed as well as a time delay phenomenon with respect to the synchronization completion time of the engine speed and the motor speed occurs.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system and a method for controlling a lock-up of an engine clutch of a hybrid vehicle, which allow synchronization between an engine speed and a motor speed for a lock-up of an engine clutch to be easily performed by referring to an engine speed profile in real time and adaptively adjusting an increase or a decrease in torque reduction ratio of a hybrid starter generator (HSG) according to an actual engine speed in an engine firing process including a first combustion timing of an engine after an engine cranking process of outputting a torque of the HSG as a maximum torque.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

In various exemplary embodiments of the present invention, various aspects of the present invention provide a system for controlling a lock-up of an engine clutch of a hybrid vehicle, which includes an engine and a motor which are mounted in series with each other; the engine clutch mounted between the engine and the motor and configured to selectively transmit power of the engine between the engine and the motor; a hybrid starter generator (HSG) connected to a crank pulley of the engine and driven to start the engine; and a controller connected to the HSG and configured to determine a virtual engine speed in an engine firing process and a torque reduction ratio (d) of the HSG according to the virtual engine speed after an engine cranking process of outputting a maximum torque of the HSG and determine a correction reduction ratio (h) with respect to the torque reduction ratio (d) of the HSG using a difference value (e) between the virtual engine speed and an actual engine speed, and adjust an increase or a decrease of the torque reduction ratio (d) of the HSG to synchronize an engine speed with a motor speed for the lock-up of the engine clutch.

In various exemplary embodiments of the present invention, to determine the virtual engine speed and the torque reduction ratio (d) of the HSG, the controller may be configured to perform determining an engine speed average acceleration value (a) in the engine cranking process according to the maximum torque of the HSG, determining a difference value (b) between the engine speed and an engine target speed at a timing at which the engine cranking process is switched to the engine firing process, and determining a time (c) in which the engine speed reaches the engine target speed in the engine firing process.

The controller may be configured to determine the torque reduction ratio (d) of the HSG by dividing a maximum torque of the HSG at a start timing of the engine firing process by the time (c) in which the engine speed reaches the engine target speed.

In various exemplary embodiments of the present invention, the controller may be configured to determine the correction reduction ratio (h) with respect to the torque reduction ratio (d) of the HSG including inputting a difference value (e) obtained by subtracting the actual engine speed from the virtual engine speed and a difference value between the engine target speed and the actual engine speed into a 2-dimensional (2-D) map to obtain a correction factor (g) for correcting the torque reduction ratio (d) of the HSG from the 2-D map; and multiplying the obtained correction factor (g) by the torque reduction ratio (d) of the HSG.

When the difference value (e) obtained by subtracting the actual engine speed from the virtual engine speed is a negative (−) value, the controller may be configured to adjust an increase amount of the torque reduction ratio (d) of the HSG by as much as the correction reduction ratio (h), and when the difference value (e) obtained by subtracting the actual engine speed from the virtual engine speed is a positive (+) value, the controller may be configured to adjust a decrease amount of the torque reduction ratio (d) of the HSG by as much as the correction reduction ratio (h).

In various exemplary embodiments of the present invention, when the difference value (e) obtained by subtracting the actual engine speed from the virtual engine speed is greater than a threshold value and the correction reduction ratio (h) with respect to the torque reduction ratio (d) of the HSG is smaller than a maximum slip rate of a belt of the HSG, the controller may be configured to limit the torque reduction ratio (d) of the HSG to a torque reduction ratio corresponding to the maximum slip rate of the belt of the HSG.

In various exemplary embodiments of the present invention, when the difference value (e) obtained by subtracting the actual engine speed from the virtual engine speed is greater than a threshold value and a torque of the HSG is smaller than a maximum torque of the HSG in a specification thereof, the controller may be configured to limit the torque of the HSG to the maximum torque of the HSG in the specification thereof.

In another exemplary embodiment of the present invention, various aspects of the present invention provide a method of controlling a lock-up of an engine clutch of a hybrid vehicle, which includes determining a virtual engine speed in an engine firing process and a torque reduction ratio (d) of a hybrid starter generator (HSG) according to the virtual engine speed after an engine cranking process of outputting a maximum torque of the HSG; determining a correction reduction ratio (h) with respect to the torque reduction ratio (d) of the HSG using a difference value (e) between the virtual engine speed and an actual engine speed; and adjusting an increase or a decrease of the torque reduction ratio (d) of the HSG by as much as the correction reduction ratio (h), and simultaneously, synchronizing the actual engine speed with a motor speed, wherein synchronization between an engine speed and the motor speed for the lock-up of the engine clutch is performed at a timing at which a torque of the HSG becomes zero.

In another exemplary embodiment of the present invention, the determining of the virtual engine speed and the torque reduction ratio (d) of the HSG may include determining an engine speed average acceleration value (a) in the engine cranking process according to the maximum torque of the HSG; determining a difference value (b) between the engine speed and an engine target speed at a timing at which the engine cranking process is switched to the engine firing process; and determining a time (c) in which the engine speed reaches the engine target speed in the engine firing process.

The torque reduction ratio (d) of the HSG may be determined by dividing a maximum torque of the HSG at a start timing of the engine firing process by the time (c) in which the engine speed reaches the engine target speed.

In another exemplary embodiment of the present invention, the determining of the correction reduction ratio (h) with respect to the torque reduction ratio (d) of the HSG may include inputting a difference value (e) obtained by subtracting the actual engine speed from the virtual engine speed and a difference value between the engine target speed and the actual engine speed into a 2-dimensional (2-D) map to obtain a correction factor (g) for correcting the torque reduction ratio (d) of the HSG from the 2-D map; and multiplying the obtained correction factor (g) by the torque reduction ratio (d) of the HSG.

When the torque reduction ratio (d) of the HSG is adjusted to be increased or decreased by as much as the correction reduction ratio (h), when the difference value (e) obtained by subtracting the actual engine speed from the virtual engine speed is a negative (−) value, the torque reduction ratio (d) of the HSG may be adjusted to be increased by as much as the correction reduction ratio (h), whereas, when the difference value (e) obtained by subtracting the actual engine speed from the virtual engine speed is a positive (+) value, the torque reduction ratio (d) of the HSG may be adjusted to be decreased by as much as the correction reduction ratio (h).

In another exemplary embodiment of the present invention, the method may further include limiting a magnitude of the increase and decrease of the torque reduction ratio (d) of the HSG.

When the difference value (e) obtained by subtracting the actual engine speed from the virtual engine speed is greater than a threshold value and the correction reduction ratio (h) with respect to the torque reduction ratio (d) of the HSG is smaller than a maximum slip rate of a belt of the HSG, the torque reduction ratio (d) of the HSG may be limited to a torque reduction ratio corresponding to the maximum slip rate of the belt of the HSG.

Otherwise, when the difference value (e) obtained by subtracting the actual engine speed from the virtual engine speed is greater than a threshold value and a torque of the HSG is smaller than a maximum torque of the HSG in a specification thereof, the torque of the HSG may be limited to the maximum torque of the HSG in the specification thereof.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

As shown in FIG. 1, a powertrain for a hybrid vehicle may include an engine 10 and a motor 12 which are mounted in series with each other, an engine clutch 13 mounted between the engine 10 and the motor 12 and configured to transmit or disconnect power of the engine 10, a transmission 14 configured to shift power of the motor 12 or power of the motor 12 and the engine 10 to output the shifted power to a driving wheel, a hybrid starter generator (HSG) 16, which is a kind of a motor, connected to a crank pulley 15 of the engine 10 and configured to generate electric power for a starting of the engine 10 and battery charging, an inverter 18 configured to control charging/discharging of the motor 12 and control the electric power generation of the HSG 16, and a high voltage battery 20 chargeably and dischargeably connected to the motor 12 and the HSG 16 via the inverter 18.

In an electric vehicle (EV) mode among driving modes of the hybrid vehicle, the hybrid vehicle is driving with only an output torque of the motor 12 in a lock-up release state of the engine clutch 13, and in a hybrid EV (HEV) mode, the hybrid vehicle is driving with the sum of output torques of the engine 10 and the motor 12 in a lock-up state of the engine clutch 13.

Figure 10:
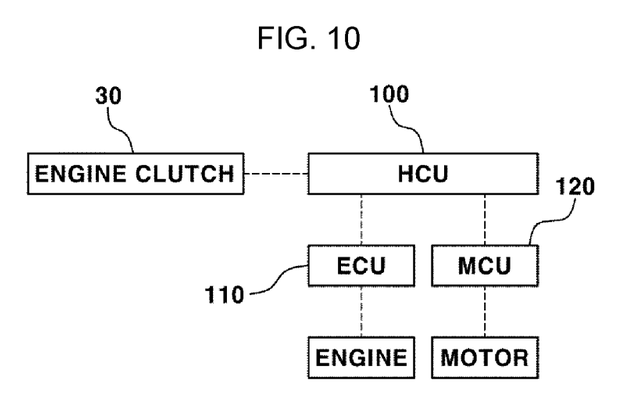
FIG. 10 is a control block diagram illustrating engine clutch lock-up control of a hybrid vehicle according to various exemplary embodiments of the present invention.

As shown in FIG. 10, an overall control process of locking-up the engine clutch 13 may be performed through cooperative control of an engine controller 110 and a motor controller 120 in addition to a hybrid controller 100 which is a highest level controller of the hybrid vehicle.

For example, a lock-up operation and a lock-up release operation of the engine clutch 13 may be performed under the control of the hybrid controller 100, driving control of the HSG 16 related to the lock-up of the engine clutch 13 may be performed by the motor controller 120 which receives a command from the hybrid controller 100, and engine speed control related to the lock-up of the engine clutch 13 may be performed by the engine controller 110 which receives a command from the hybrid controller 100.

Thus, the engine clutch lock-up control of the present invention may be performed by a plurality of controllers which perform cooperative control, such as the hybrid controller 100, the motor controller 120, and the engine controller 110 but may also be performed by one integrated controller. Accordingly, hereinafter, all of the plurality of controllers and the one integrated controller will be collectively referred to as a controller.

Here, a system and a method for controlling a lock-up of an engine clutch of a hybrid vehicle according to various exemplary embodiments of the present invention will be referred to as follows.

Figure 4:
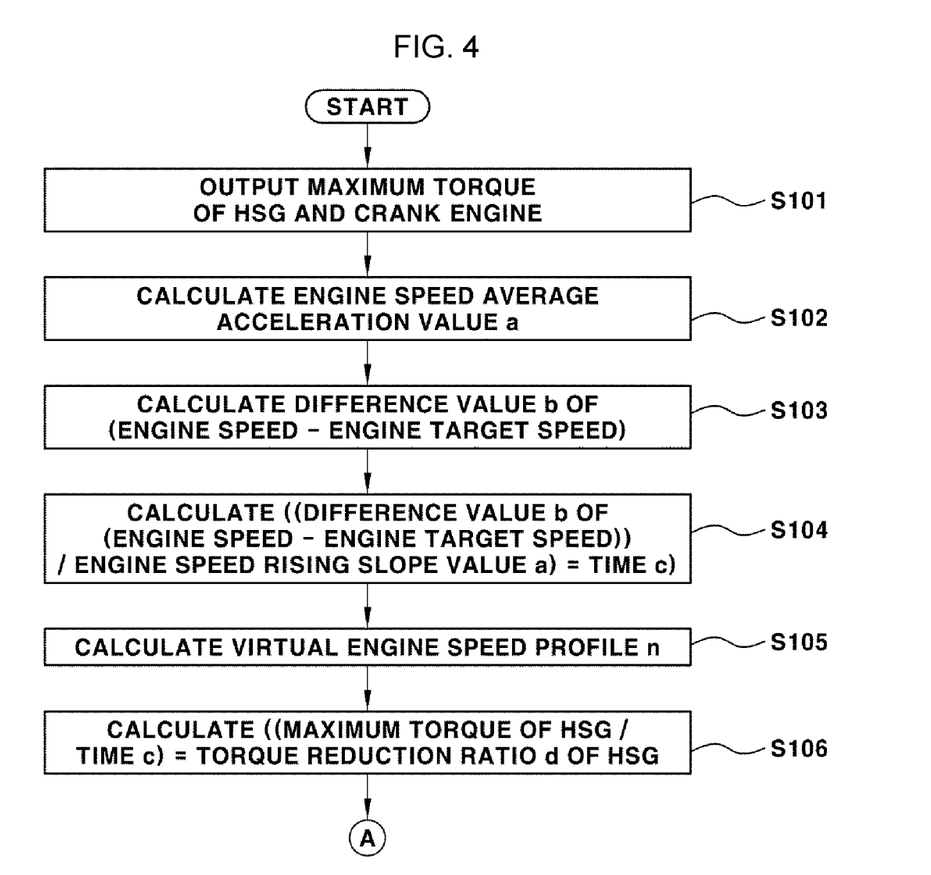
FIG. 4 and FIG. 5 are flowcharts illustrating an engine clutch lock-up control process of a hybrid vehicle according to various exemplary embodiments of the present invention.
Figure 5:
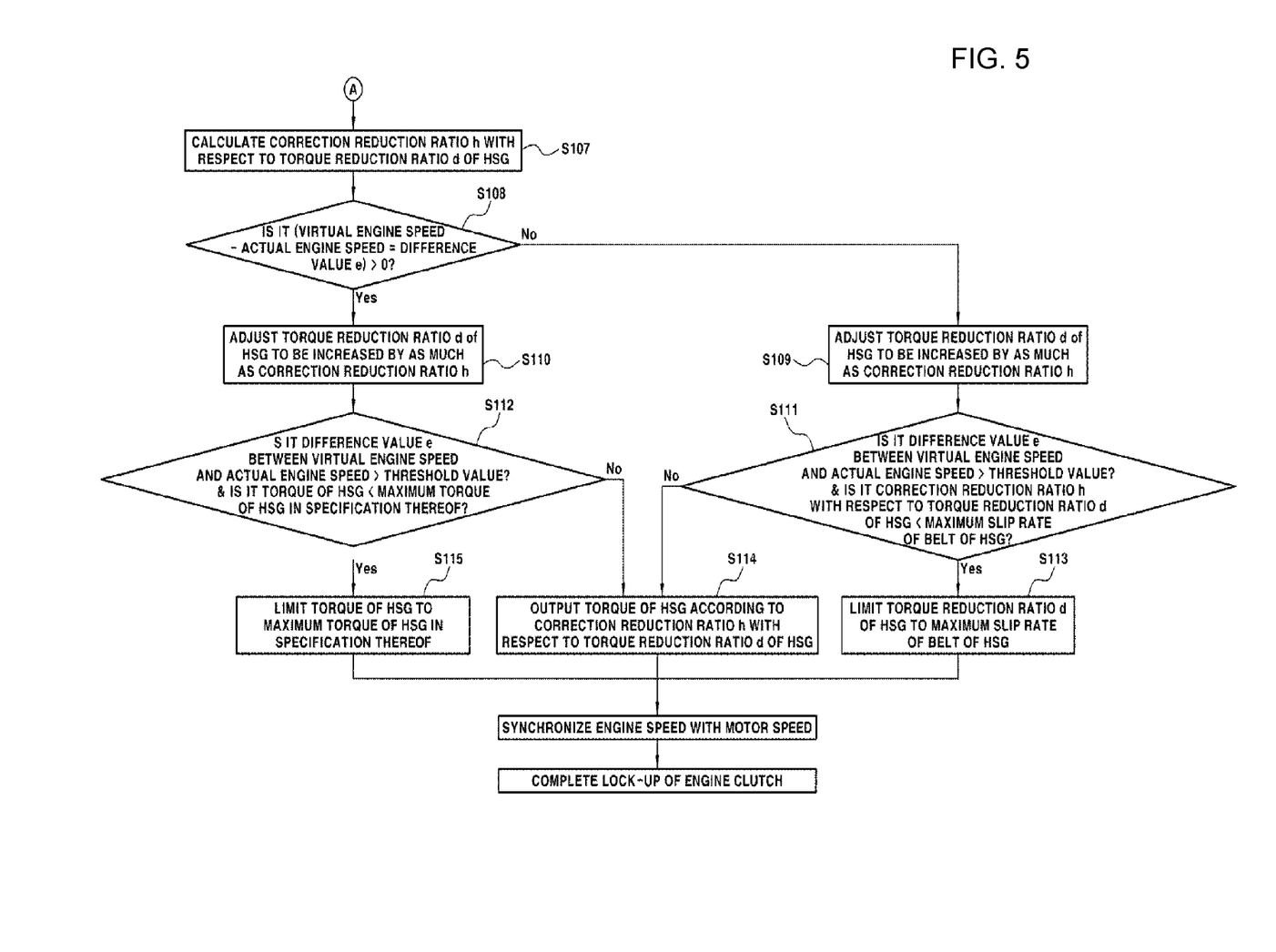
Figure 6:
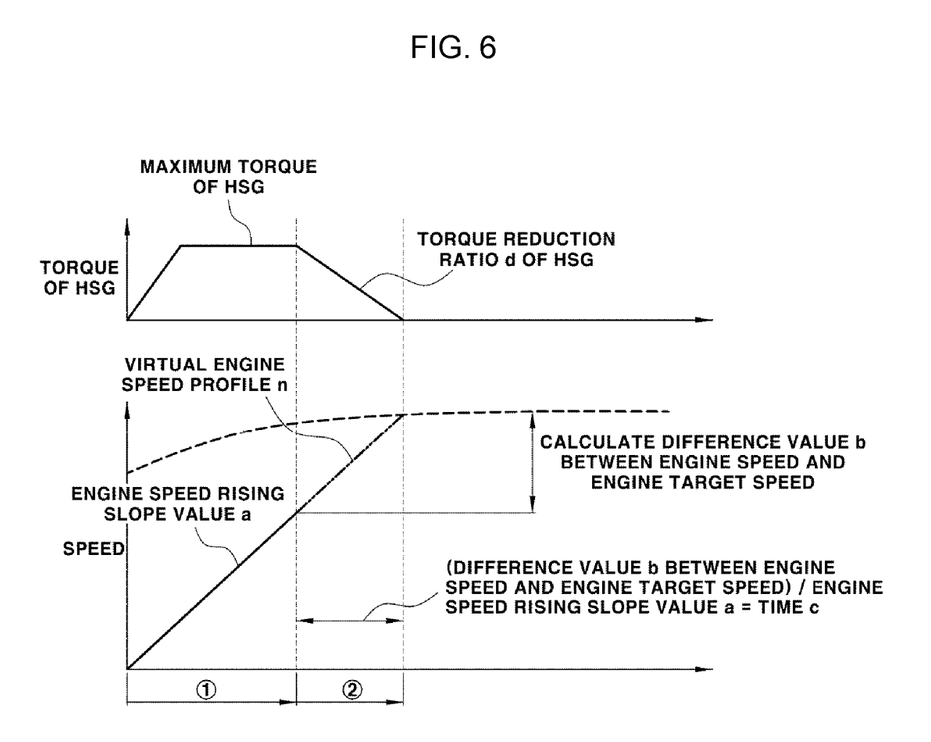
FIG. 6, FIG. 7, and FIG. 8 are control graphs showing the engine clutch lock-up control process of a hybrid vehicle according to various exemplary embodiments of the present invention.
Figure 7:
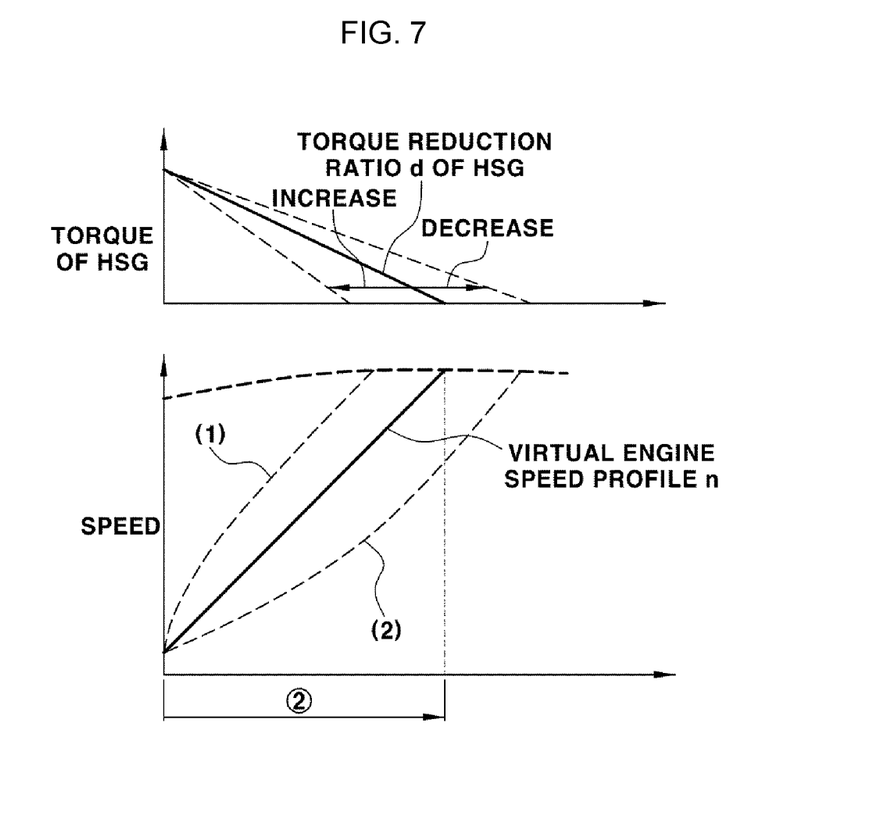
Figure 8:
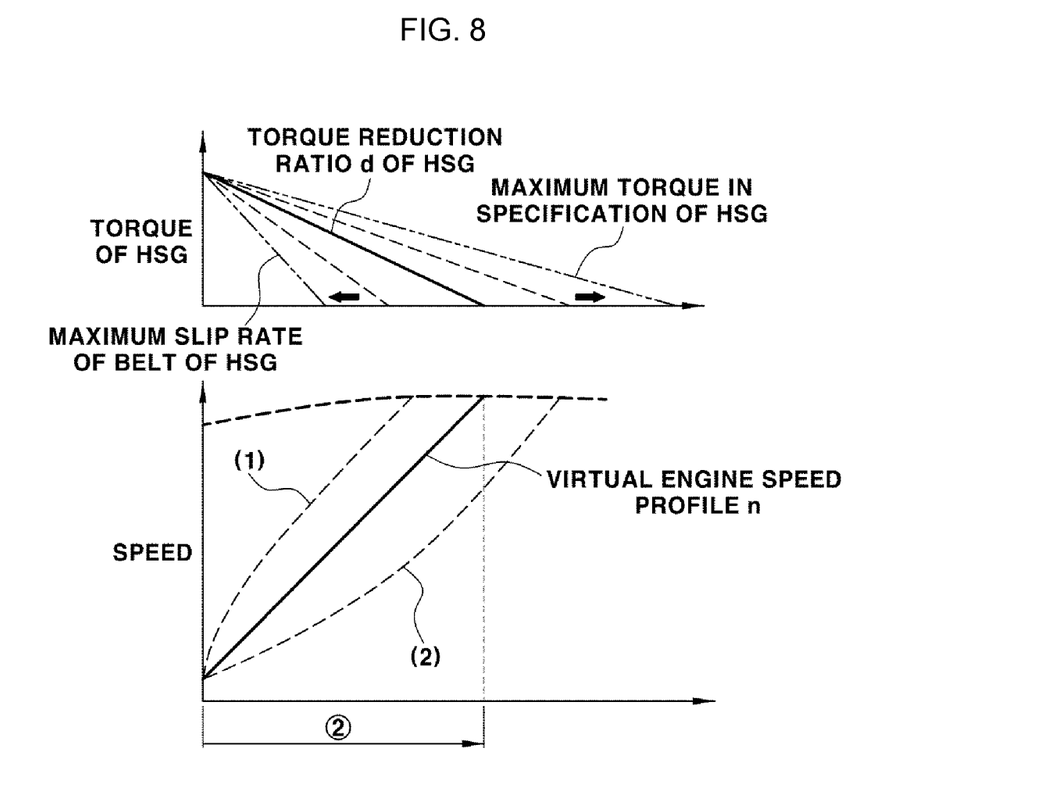

FIG. 4 and FIG. 5 are flowcharts illustrating an engine clutch lock-up control process of a hybrid vehicle according to various exemplary embodiments of the present invention, and FIG. 6, FIG. 7, and FIG. 8 are control graphs showing the engine clutch lock-up control process of a hybrid vehicle according to various exemplary embodiments of the present invention.

As described above, a process of controlling a synchronizing lock-up of the engine clutch 13 is performed in detail in the order of an engine cranking process, an engine firing process, and an engine speed control process.

The present invention focuses to allow synchronization between an engine speed and a motor speed for the lock-up of the engine clutch to be easily performed by referring to an engine speed profile in real time and adaptively adjusting an increase or a decrease in torque reduction ratio d of the HSG according to the actual engine speed in the engine firing process including a first combustion timing of the engine after the engine cranking process of outputting a torque of the HSG as a maximum torque.

To this end, a virtual engine speed profile n during the engine firing process and the torque reduction ratio d of the HSG according to the virtual engine speed profile n are determined first.

To determine the virtual engine speed profile n and the torque reduction ratio d of the HSG, an engine speed average acceleration value an in the engine cranking process according to the maximum torque of the HSG is determined.

For reference, the engine cranking process is performed due to driving of the HSG connected to a crankshaft of the engine, and a torque of the HSG is output as a maximum torque in the engine cranking process indicated by Section ① of FIG. 6.

Thus, when the maximum torque of the HSG is output to the crankshaft of the engine for engine cranking (S101), the controller is configured to determine the engine speed average acceleration value a in a process of cranking the engine due to the maximum torque of the HSG (S102).

In the instant case, as shown in FIG. 6, the engine speed average acceleration value a may be expressed as an engine speed rising slope value a in a process of cranking the engine due to the maximum torque of the HSG.

Next, the controller is configured to determine a difference value b between the engine speed and an engine target speed at a time when the engine cranking process is switched to the engine firing process indicated by Section ② of FIG. 6 (S103).

Subsequently, using the engine speed average acceleration value a, which is determined in S102, that is, the engine speed rising slope value a, and the difference value b between the engine speed and the engine target speed, which is determined in S103, a time c in which the engine speed reaches the engine target speed in the engine firing process is determined (S104).

For example, the time c in which the engine speed reaches the engine target speed may be determined by dividing the difference value b between the engine speed and the engine target speed by the engine speed rising slope value a.

Subsequently, using the difference value b between the engine speed and the engine target speed and the time c in which the engine speed reaches the engine target speed, the virtual engine speed profile n in the engine firing process indicated by Section ② of FIG. 6 is determined (S105).

For example, since the difference value b between the engine speed and the engine target speed, which is determined in S103, is obtained and the time c in which the engine speed reaches the engine target speed, which is determined in S104, is obtained, the virtual engine speed profile n in the engine firing process, which has the same slope value as the engine speed rising slope value a, may be determined.

Subsequently, the torque reduction ratio d of the HSG, which reaches zero (0) during the time c in which the engine speed, that is, the maximum torque of the HSG at a start timing of the engine firing process reaches the engine target speed, is determined (S106).

For example, the maximum torque of the HSG at the start timing of the engine firing process is divided by the time c in which the engine speed reaches the engine target speed so that the torque reduction ratio d of the HSG, in which the torque of the HSG reaches zero (0), may be determined.

Next, in consideration of a difference value e between a virtual engine speed and an actual engine speed, the controller is configured to determine a correction reduction ratio h with respect to the torque reduction ratio d of the HSG (S107).

That is, when the engine is driven for the lock-up of the engine clutch of a real vehicle, since the actual engine speed may be different from the virtual engine speed determined as the above description, the controller is configured to determine the correction reduction ratio h with respect to the torque reduction ratio d of the HSG using the difference value e between the virtual engine speed and the actual engine speed and a difference value f between the engine target speed and the actual engine speed.

Figure 9:
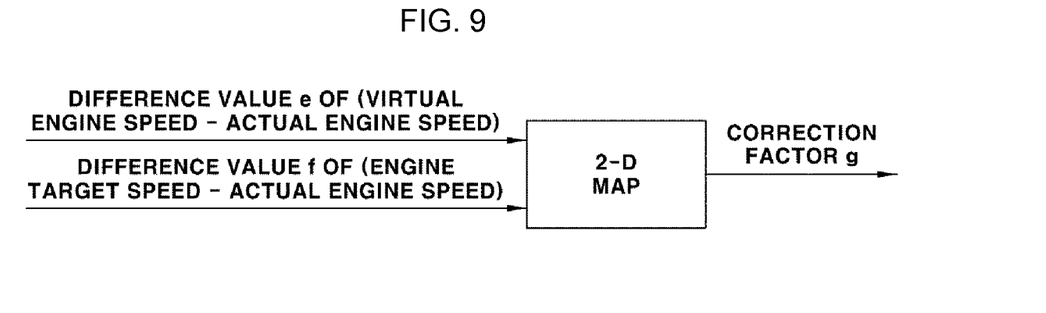
FIG. 9 is a conceptual diagram illustrating determination of a correction factor for correcting a torque reduction ratio of a hybrid starter generator (HSG) during the engine clutch lock-up control process of a hybrid vehicle according to various exemplary embodiments of the present invention.

As shown in the conceptual diagram of FIG. 9, the process of determining the correction reduction ratio h with respect to the torque reduction ratio d of the HSG includes inputting the difference value e obtained by subtracting the actual engine speed from the virtual engine speed and the difference value f between the engine target speed and the actual engine speed into a 2-D map in advance, which is stored in a memory of the controller, through a test to obtain a correction factor g for correcting the torque reduction ratio d of the HSG from the 2-D map; and multiplying the obtained correction factor g by the torque reduction ratio d of the HSG, which is determined in S106.

In the instant case, it is determined whether the difference value e obtained by subtracting the actual engine speed from the virtual engine speed is a negative value or a positive value (S108). When the difference value e obtained by subtracting the actual engine speed from the virtual engine speed is a negative (−) value, since it is a case in which an increase of the actual engine speed is greater than that of the virtual engine speed (indicated by (1) of FIG. 7), the torque reduction ratio d of the HSG is adjusted to be increased by as much as the correction reduction ratio h toward an arrow direction indicating as the increase in FIG. 7 (S109).

Otherwise, when the difference value e obtained by subtracting the actual engine speed from the virtual engine speed is a positive (+) value, since it is a case in which the increase of the actual engine speed is less than that of the virtual engine speed (indicated by (2) of FIG. 7), the torque reduction ratio d of the HSG is adjusted to be decreased by as much as the correction reduction ratio h toward an arrow direction indicating as the decrease in FIG. 7 (S110).

As described above, the torque reduction ratio d of the HSG is adjusted to be increased or decreased by as much as the correction reduction ratio h, and simultaneously, the actual engine speed is synchronized with the motor speed so that synchronization between the engine speed and the motor speed for the lock-up of the engine clutch may be easily performed at a timing at which the torque of the HSG becomes zero.

In other words, the synchronization between the engine speed and the motor speed for the lock-up of the engine clutch may be easily performed at the timing at which the torque of the HSG becomes zero by referring to a virtual engine speed profile and adaptively adjusting an increase or a decrease in torque reduction ratio d of the HSG according to the actual engine speed in the engine firing process after the engine cranking process of outputting a torque of the HSG as a maximum torque.

Meanwhile, upon driving of the engine for the lock-up of the engine clutch of the hybrid vehicle, when the difference between the actual engine speed and the virtual engine speed which is determined as the above description is too large, a magnitude of the increase or decrease in torque reduction ratio d of the HSG becomes so large which is not satisfied by a specification of the HSG so that a failure or performance degradation of the HSG may be caused.

Thus, it is preferable to set a limit value to the magnitude of the increase and decrease with respect to the torque reduction ratio d of the HSG.

To this end, the controller may further perform limiting the magnitude of the increase and decrease with respect to the torque reduction ratio d of the HSG to a predetermined magnitude.

After S109, the difference value e obtained by subtracting the actual engine speed from the virtual engine speed is compared with a threshold value, and simultaneously, the correction reduction ratio h with respect to the torque reduction ratio d of the HSG is compared with a maximum slip rate of a belt 17 of the HSG (S111).

As the comparison result, when the difference value e obtained by subtracting the actual engine speed from the virtual engine speed is greater than the threshold value and the correction reduction ratio h with respect to the torque reduction ratio d of the HSG is smaller than the maximum slip rate of the belt of the HSG, as shown in FIG. 8, the torque reduction ratio d of the HSG is limited to a torque reduction ratio corresponding to the maximum slip rate of the belt of the HSG (S113).

Otherwise, after S110, the difference value e obtained by subtracting the actual engine speed from the virtual engine speed is compared with the threshold value, and simultaneously, the torque of the HSG is compared with a maximum torque of the HSG in the specification thereof (S112). In an exemplary embodiment of the present invention, the maximum torque of the HSG in the specification thereof may be a predetermined maximum torque.

As the comparison result, when the difference value e obtained by subtracting the actual engine speed from the virtual engine speed is greater than the threshold value and the torque of the HSG is smaller than the maximum torque of the HSG in the specification thereof, as shown in FIG. 8, the torque of the HSG is limited to the maximum torque of the HSG in the specification thereof (S114).

In the instant case, as the comparison result in S111 and S112, when the difference value e obtained by subtracting the actual engine speed from the virtual engine speed is smaller than the threshold value, the torque of the HSG is output according to the correction reduction ratio h with respect to the torque reduction ratio d of the HSG (S115).

As described above, the limit value is set to the magnitude of the increase and decrease with respect to the torque reduction ratio d of the HSG so that the magnitude of the increase or decrease with respect to the torque reduction ratio d of the HSG may be easily satisfied by the specification of the HSG. Consequently, the driving for the lock-up of the engine clutch of the HSG may be smoothly performed.

Various aspects of the present invention provide the following effects through the above-described problem solving means.

First, synchronization between an engine speed and a motor speed for a lock-up of an engine clutch may be easily performed at a timing at which a torque of a hybrid starter generator (HSG) becomes zero by referring to an engine speed profile in real time and adaptively adjusting an increase or a decrease in torque reduction ratio of the HSG according to an actual engine speed in an engine firing process after an engine cranking process of outputting a torque of the HSG as a maximum torque.

Second, a limit value is set to a magnitude of the increase and decrease with respect to the torque reduction ratio of the HSG so that the magnitude of the increase or decrease with respect to the torque reduction ratio of the HSG may be easily satisfied by the specification of the HSG.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling a lock-up of an engine clutch of a vehicle, the system comprising:
   an engine and a motor which are mounted in series;
   the engine clutch mounted between the engine and the motor and configured to selectively transmit power of the engine between the engine and the motor;
   a hybrid starter generator (HSG) connected to a crank pulley of the engine and driven to start the engine; and
   a controller connected to the HSG and configured to determine a virtual engine speed in an engine firing process and a torque reduction ratio of the HSG according to the virtual engine speed after an engine cranking process of outputting a maximum torque of the HSG, to determine a correction reduction ratio with respect to the torque reduction ratio of the HSG using a difference value between the virtual engine speed and an actual engine speed, and to adjust an increase or a decrease of the torque reduction ratio of the HSG to synchronize an engine speed with a motor speed for the lock-up of the engine clutch.

2. The system of claim 1, wherein, to determine the virtual engine speed and the torque reduction ratio of the HSG, the controller is configured to perform determining an engine speed average acceleration value in the engine cranking process according to the maximum torque of the HSG, determining a difference value between the engine speed and an engine target speed at a timing at which the engine cranking process is switched to the engine firing process, and determining a time in which the engine speed reaches the engine target speed in the engine firing process.

3. The system of claim 2, wherein the controller is configured to determine the torque reduction ratio of the HSG by dividing a maximum torque of the HSG at a start timing of the engine firing process by the time in which the engine speed reaches the engine target speed.

4. The system of claim 1, wherein the controller is configured to determine the correction reduction ratio with respect to the torque reduction ratio of the HSG, by inputting the difference value obtained by subtracting the actual engine speed from the virtual engine speed and a difference value between an engine target speed and the actual engine speed into a 2-dimensional (2-D) map to obtain a correction factor for correcting the torque reduction ratio of the HSG from the 2-D map and multiplying the obtained correction factor by the torque reduction ratio of the HSG.

5. The system of claim 4, wherein, when the difference value obtained by subtracting the actual engine speed from the virtual engine speed is a negative (−) value, the controller is configured to adjust an increase amount of the torque reduction ratio of the HSG by as much as the correction reduction ratio.

6. The system of claim 4, wherein, when the difference value obtained by subtracting the actual engine speed from the virtual engine speed is a positive (+) value, the controller is configured to adjust a decrease amount of the torque reduction ratio of the HSG by as much as the correction reduction ratio.

7. The system of claim 1, wherein, when the difference value obtained by subtracting the actual engine speed from the virtual engine speed is greater than a threshold value and the correction reduction ratio with respect to the torque reduction ratio of the HSG is smaller than a maximum slip rate of a belt of the HSG, the controller is configured to limit the torque reduction ratio of the HSG to a torque reduction ratio corresponding to the maximum slip rate of the belt of the HSG.

8. The system of claim 1, wherein, when the difference value obtained by subtracting the actual engine speed from the virtual engine speed is greater than a threshold value and a torque of the HSG is smaller than a predetermined maximum torque of the HSG, the controller is configured to limit the torque of the HSG to the predetermined maximum torque of the HSG.

9. A method of controlling a lock-up of an engine clutch of a vehicle, the method comprising:

determining, by a controller, a virtual engine speed in an engine firing process and a torque reduction ratio of a hybrid starter generator (HSG) according to the virtual engine speed after an engine cranking process of outputting a maximum torque of the HSG;

determining, by the controller, a correction reduction ratio with respect to the torque reduction ratio of the HSG using a difference value between the virtual engine speed and an actual engine speed; and adjusting, by the controller, an increase or a decrease of the torque reduction ratio of the HSG by as much as the correction reduction ratio, and synchronizing the actual engine speed with a motor speed, wherein synchronization between an engine speed and the motor speed for the lock-up of the engine clutch is performed at a timing at which a torque of the HSG becomes zero.

10. The method of claim 9, wherein the determining of the virtual engine speed and the torque reduction ratio of the HSG includes:

determining an engine speed average acceleration value in the engine cranking process according to the maximum torque of the HSG;

determining a difference value between the engine speed and an engine target speed at a timing at which the engine cranking process is switched to the engine firing process; and determining a time in which the engine speed reaches the engine target speed in the engine firing process.

11. The method of claim 10, wherein the torque reduction ratio of the HSG is determined by dividing a maximum torque of the HSG at a start timing of the engine firing process by the time in which the engine speed reaches the engine target speed.

12. The method of claim 9, wherein the determining of the correction reduction ratio with respect to the torque reduction ratio of the HSG includes:

inputting the difference value obtained by subtracting the actual engine speed from the virtual engine speed and a difference value between an engine target speed and the actual engine speed into a 2-dimensional (2-D) map to obtain a correction factor for correcting the torque reduction ratio of the HSG from the 2-D map; and multiplying the obtained correction factor by the torque reduction ratio of the HSG.

13. The method of claim 9, wherein when the torque reduction ratio of the HSG is adjusted to be increased or decreased by as much as the correction reduction ratio and when the difference value obtained by subtracting the actual engine speed from the virtual engine speed is a negative (−) value, the torque reduction ratio of the HSG is adjusted to be increased by as much as the correction reduction ratio.

14. The method of claim 9, wherein when the torque reduction ratio of the HSG is adjusted to be increased or decreased by as much as the correction reduction ratio and when the difference value obtained by subtracting the actual engine speed from the virtual engine speed is a positive (+) value, the torque reduction ratio of the HSG is adjusted to be decreased by as much as the correction reduction ratio.

15. The method of claim 9, further including:

limiting a magnitude of the increase and decrease of the torque reduction ratio of the HSG to a predetermined magnitude.

16. The method of claim 15, wherein, when the difference value obtained by subtracting the actual engine speed from the virtual engine speed is greater than a threshold value and the correction reduction ratio with respect to the torque reduction ratio of the HSG is smaller than a maximum slip rate of a belt of the HSG, the torque reduction ratio of the HSG is limited to a torque reduction ratio corresponding to the maximum slip rate of the belt of the HSG.

17. The method of claim 15, wherein, when the difference value obtained by subtracting the actual engine speed from the virtual engine speed is greater than a threshold value and the torque of the HSG is smaller than a predetermined maximum torque of the HSG, the torque of the HSG is limited to the predetermined maximum torque of the HSG.

18. The method of claim 9, wherein the controller includes:

a processor; and a non-transitory storage medium on which a program for performing the method of claim 9 is recorded and executed by the processor.

19. A non-transitory computer readable medium on which a program for performing the method of claim 9 is recorded.

* * * * *